United States Patent [19]

Inoue et al.

[11] Patent Number: 4,665,134

[45] Date of Patent: May 12, 1987

[54] PROCESS FOR PRODUCING BLOCK COPOLYMER

[75] Inventors: Shohei Inoue; Takuzo Aida, both of Tokyo, Japan

[73] Assignee: Hitachi Chemical Company Ltd., Tokyo, Japan

[21] Appl. No.: 751,138

[22] Filed: Jul. 2, 1985

[30] Foreign Application Priority Data

Sep. 5, 1984 [JP] Japan ................................ 59-185971

[51] Int. Cl.$^4$ ............................................. C08G 63/10
[52] U.S. Cl. .................................. 525/419; 528/356; 528/357; 528/366
[58] Field of Search ............... 525/419, 437; 528/356, 528/357, 366

[56] References Cited

U.S. PATENT DOCUMENTS 3,682,865  8/1972  Jenkins ................................ 528/357
4,031,165  6/1977  Saiki .................................... 525/444
4,500,686  2/1985  Kobayashi .......................... 525/408

Primary Examiner—John C. Bleutge
Assistant Examiner—Patricia A. Short
Attorney, Agent, or Firm—Antonelli, Terry & Wands

[57] ABSTRACT

A block copolymer having a narrow molecular weight distribution is produced by reacting an acid anhydride with an epoxide to yield a polyester, which is further reacted with a lactone, using a catalyst system comprising an aluminum porphyrin complex and an organic quaternary salt under mild reaction conditions.

10 Claims, No Drawings

PROCESS FOR PRODUCING BLOCK COPOLYMER

BACKGROUND OF THE INVENTION

This invention relates to a process for producing a block copolymer having a narrow molecular weight distribution.

In condensation polymers such as polyesters, it was very difficult to directly produce polymers having a narrow molecular weight distribution. In order to produce polymers having an almost uniform molecular weight, it was necessary to employ a fractionation method or the like.

Further, in the case of condensation polymers, since the condensation and decomposition take place at the same time, random copolymers are easily produced, while block copolymers are not obtained in general.

SUMMARY OF THE INVENTION

It is an object of this invention to provide a process for producing a block copolymer having a narrow molecular weight distribution by using a catalyst system containing an aluminum porphyrin complex, which was found as a catalyst for producing a homopolymer of an epoxide (Die Makromolekulare Chemie., 182 (4), 1073-9 (1981)), and an organic quaternary salt.

This invention provides a process for producing a block copolymer which comprises reacting an acid anhydride with an epoxide using a catalyst system comprising an aluminum porphyrin complex and an organic quaternary salt to produce a polyester, followed by reacting the polyester with a lactone in the presence of the above-mentioned catalyst.

DESCRIPTION OF THE PREFERRED EMBODIMENTS

The molecular weight distribution is defined in this invention as the ratio of weight average molecular weight ($\overline{M}w$) to number average molecular weight ($\overline{M}n$), i.e. $\overline{M}w/\overline{M}n$.

The aluminum porphyrin complex used as a component of the catalyst in this invention is obtained by reacting an organoaluminum compound with a porphyrin and represented by the following formula:

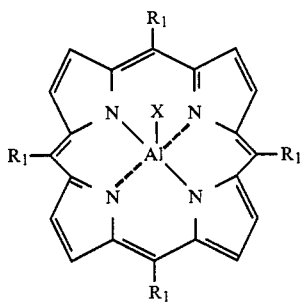

wherein X is a halogen, an alkyl group preferably having 1 to 4 carbon atoms, or an alkoxy group preferably having 1 to 5 carbon atoms; $R_1$ is hydrogen or a group of the formula:

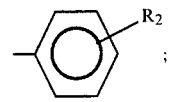

$R_2$ is hydrogen, a halogen, an alkyl group preferably having 1 to 4 carbon atoms, or an alkoxy group preferably having 1 to 4 carbon atoms. The term "halogen" includes chlorine, fluorine, iodine and bromine.

Examples of the aluminum porphyrin complex are tetraphenylporphinatoaluminum chloride, tetraphenylporphinatoaluminum methoxide, tetraphenylporphinatoaluminum methyl, etc.

The aluminum porphyrin complex of the formula (I) is a known compound obtained by reacting, for example, a porphine with an about equimolar amount of organoaluminum compound in the presence of a solvent in an inert gas atmosphere at about room temperature.

As the porphine, there can be used porphine or a tetraphenylporphine substituted or non-substituted at individual phenyl groups. Examples of the substituents are halogen such as chlorine, bromine, etc., an alkyl group preferably having 1 to 4 carbon atoms such as methyl, ethyl, etc., and an alkoxy group preferably having 1 to 4 carbon atoms such as methoxy, ethoxy, etc.

Porphine or a tetraphenylporphine substituted or non-substituted at individual phenyl groups can be produced from, for example, benzaldehyde and pyrrole, or a substituted benzaldehyde having the corresponding substituent and pyrrole by a conventional method.

As the organoaluminum compound, there can be used dialkylaluminum halides such as diethylaluminum chloride, diethylaluminum bromide, etc.; dialkylaluminum alkoxides such as diethylaluminum methoxide, diethylaluminum ethoxide, etc.

As the solvent, there can be used hydrocarbons such as benzene, toluene, xylenes, etc.; halogenated hydrocarbons such as methylene chloride, chloroform, dichloroethane, etc. The amount of the solvent can be selected properly.

As the organic quaternary salt used as a component of the catalyst together with the aluminum porphyrin complex, there can be used phosphonium salts such as ethyltriphenylphosphonium bormide, ethyltriphenylphosphonium iodide, etc.; ammonium salts such as tetraethylammonium chloride, tetraethylammonium bromide, tetraethylammonium acetate, etc. Among them, the use of ethyltriphenylphosphonium bromide is particularly preferable.

Examples of the acid anhydride are phthalic anhydride, tetrahydrophthalic anhydride, tetrabromophthalic anhydride, maleic anhydride, etc. These acid anhydrides can be used alone or as a mixture thereof.

Examples of the epoxide are aliphatic alkylene oxides having a terminal three-membered epoxy group such as ethylene oxide, propylene oxide, 1-butylene oxide, epichlorohydrin, etc.; alicyclic alkylene oxides having a three-membered epoxy group such as cyclohexene oxide, cyclopentene oxide, etc.; aromatic alkylene oxides having a three-membered epoxy group such as styrene oxide, phenyl glycidyl ether, etc. These epoxides can be used alone or as a mixture thereof.

The production of polyester can be carried out in the presence of a solvent or in the absence of a solvent by adding the aluminum porphyrin complex of the formula (I) and the organic quaternary salt to a mixture of an acid anhydride and an epoxide preferably in an atmosphere of an inert gas.

It is preferable to use nitrogen as the inert gas.

As the solvent, there can be used methylene chloride, chloroform, dichloroethane, benzene, toluene, dioxane, tetrahydrofuran, etc. Among them, the use of a halogenated hydrocarbon is preferable.

The reaction can sufficiently proceed at room temperature. It is also possible to carry out the reaction with heating preferably at upto 80° C.

There is no particular limit to the ratio of the acid anhydride to the epoxide, but it is preferable to use the acid anhydride and the epoxide in equimolar amounts.

There is also no particular limit to the ratio of the aluminum porphyrin complex of the formula (I) to the organic quaternary salt. The organic quaternary salt is usually used in an amount of 1/10 to 10 moles per mole of the aluminum porphyrin complex of the formula (I), and preferably about 1 mole of the former per mole of the latter.

There is no particular limit to the ratio of the epoxide to the aluminum porphyrin complex of the formula (I), but it is preferable to use the epoxide in an amount of 10 to 1000 moles per mole of the aluminum porphyrin complex.

The polyester thus obtained has a narrow molecular weight distribution ($\overline{Mw}/\overline{Mn}$) of 1.0 to 1.5, and preferably 1.0 to 1.2 when properly selecting conditions. Since the thus produced polyester has a narrow molecular weight distribution, it can advantageously be used for producing a block copolymer having a narrow molecular weight distribution as explained below.

The block copolymer having a narrow molecular weight distribution can be produced by reacting the thus produced polyester with a lactone in the presence of the above-mentioned catalyst system.

As the lactone, there can be used β-propiolactone, γ-butyrolactone, δ-valerolactone, ε-caprolactone, etc. These lactones can be used alone or as a mixture thereof.

There is no particular limit to the proportion of lactone to be added, but it is preferable to add the lactone in an amount of 10 to 1000 moles per mole of the aluminum porphyrin complex of the formula (I) used in the production of the polyester.

The reaction between the polyester and the lactone can be carried out by adding the lactone to the system containing the polyester produced, the aluminum porphyrin complex of the formula (I) and the organic quaternary salt.

The reaction between the polyester and the lactone can be carried out sufficiently at room temperature, but if desired, it is possible to heat the reaction system upto about 50° C. In order to enhance the efficiency of the reaction between the lactone and polyester, it is preferable to add a small amount of the acid anhydride or epoxide mentioned above to the polyester obtained before the reaction with the lactone.

The block copolymer thus obtained has a narrow molecular weight distribution ($\overline{Mw}/\overline{Mn}$) of 1.0 to 1.5, preferably 1.0 to 1.2, when properly selecting conditions.

The block copolymer thus obtained having a narrow molecular weight distribution can further be reacted with a lactone in the presence of the aluminum porphyrin complex and the organic quaternary salt to give a multiple block copolymer.

As the lactone, there can be used the lactones mentioned above.

The reaction can be carried out in the same manner as mentioned in the reaction between the polyester and the lactone.

The resulting multiple block copolymer also has a narrow molecular weight distribution ($\overline{Mw}/\overline{Mn}$) of 1.0 to 1.5, and preferably 1.0 to 1.2 when properly selecting conditions.

Since the thus produced block copolymer or multiple block copolymer has a molecular weight distribution in a limited range compared with known materials, it shows specially limited ranges in solubility, softening point and glass transition temperature, so that clear changes in these properties can be obtained with a slight change of conditions, which results in having properties excellent in processability and handling. The block copolymer or multiple block copolymer can effectively be used as standard substances for analyses, coating compositions, adhesives, toners for electrophotography, molding materials, etc.

This invention is illustrated by way of the following Examples.

REFERENCE EXAMPLE 1

Production of Aluminum Porphyrin Complex

In a 4-liter flask equipped with a cooling tube, 80 ml (84.8 g) of benzaldehyde, 56 ml (53.6 g) of pyrrole, and 3 liters of propionic acid were placed and reacted for 30 minutes under reflux. Then, the flask was allowed to stand for one day. After filtering the reaction mixture, recrystallization from a mixed solvent of methanol and chloroform (1:1 by weight) was carried out for purification. Thus, $\alpha,\beta,\gamma,\delta$-tetraphenylporphine was obtained in 20% yield.

The $\alpha,\beta,\gamma,\delta$-tetraphenylporphine in an amount of 0.61 g was reacted with 0.12 g of diethylaluminum chloride in 20 ml of methylene chloride as a solvent at room temperature under a nitrogen atmosphere for 60 minutes to give 20 ml of a catalyst solution containing 0.68 g of aluminum porphyrin complex (I) ($\alpha,\beta,\gamma,\delta$-tetraphenylporphinatoaluminum chloride).

EXAMPLE 1

After dissolving 25 mmole of phthalic anhydride and 25 mmole of propylene oxide in 5 ml of methylene chloride, 20 ml of a methylene chloride solution containing 1 mmole of the porphyrin complex (I) prepared in Reference Example 1 and 1 mmole of ethyltriphenylphosphonium bromide was added thereto. The reaction was carried out under a nitrogen atmosphere at room temperature for 4 days with stirring to yield a polyester (1). The polyester had an average molecular weight ($\overline{Mn}$) of 3000 and a molecular weight distribution ($\overline{Mw}/\overline{Mn}$) of 1.07.

To the resulting reaction system, 10 mmole of phthalic anhydride was added and allowed to stand for one day.

Then, 100 mmole of β-butyrolactone was added to the resulting solution and the reaction was carried out at room temperature under a nitrogen atmosphere for 4 days with stirring. The resulting polymer was a block polymer (A) of polyester-b-polyester having an average molecular weight ($\overline{Mn}$) of 6800 and a molecular weight distribution ($\overline{Mw}/\overline{Mn}$) of 1.07.

EXAMPLE 2

To the same reaction system obtained in Example 1 containing polyester (1), 8 mmole of propylene oxide was added and allowed to stand for one day.

Then, the unreacted epoxide and the solvent were removed by drying under reduced pressure, followed by addition of methylene chloride again to dissolve the polymer. Subsequently, 100 mmole of ε-caprolactone was added to the resulting solution and the reaction was carried out at room temperature under a nitrogen atmosphere for 4 days with stirring. The resulting polymer was a block polymer (B) of polyester-b-polyester having an average molecular weight ($\overline{Mn}$) of 6000 and a molecular weight distribution ($\overline{Mw}/\overline{Mn}$) of 1.15.

The molecular weight was measured by GPC using 4 columns filled with polystyrene gel (Column mix-mix-3000-2000, mfd. by Toyo Soda Manufacturing Co., Ltd.) and tetrahydrofuran as a solvent at a column temperature of 38° C. The molecular weight was calculated by using GPC spectra obtained compared with GPC spectra of standard polystyrene.

As mentioned above, the block copolymer having a narrow molecular weight distribution can be produced under mild conditions such as at room temperature.

What is claimed is:

1. A process for producing a block copolymer which comprises reacting an acid anhydride with an epoxide using a catalyst system comprising an aluminum porphyrin complex and an organic quaternary salt to produce a polyester, followed by reacting the polyester with a lactone in the presence of the above-mentioned catalyst.

2. A process according to claim 1, wherein the aluminum porphyrin complex is represented by the formula:

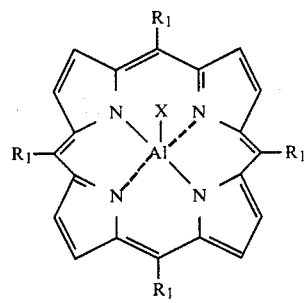

wherein X is a halogen, an alkyl group, or an alkoxy group; $R_1$ is hydrogen or a group of the formula:

$R_2$ is hydrogen, a halogen, an alkyl group or an alkoxy group.

3. A process according to claim 2, wherein the aluminum porphyrin complex is tetraphenylporphinatoaluminum chloride.

4. A process according to claim 1, wherein the organic quaternary salt is a quaternary phosphonium salt or a quaternary ammonium salt.

5. A process according to claim 4, wherein the quaternary phosphonium salt is ethyltriphenylphosphonium bromide.

6. A process according to claim 1, wherein the lactone is β-propiolactone, γ-butyrolactone, δ-valerolactone, ε-caprolactone, or a mixture thereof.

7. A process according to claim 1, wherein a small amount of an acid anhydride or epoxide is added to the reaction system before the reaction between the polyester and the lactone.

8. A process according to claim 1, which further comprises reacting the block copolymer produced with a lactone in the presence of the same catalyst system used in claim 1.

9. A block copolymer having a narrow molecular weight distribution of 1.0 to 1.5 produced by the process of claim 1; said molecular weight distribution being the ratio of weight average molecular weight to number average molecular weight.

10. A block copolymer having a narrow molecular weight distribution of 1.0 to 1.5 produced by the process of claim 8; said molecular weight distribution being the ratio of weight average molecular weight to number average molecular weight.

* * * * *